United States Patent [19]
Chabanel

[11] 4,041,534
[45] Aug. 9, 1977

[54] AUTOMATIC DISTORTION CORRECTION ARRANGEMENT

[75] Inventor: Pierre Chabanel, Paris, France

[73] Assignee: Thomson-CSF, Paris, France

[21] Appl. No.: 657,290

[22] Filed: Feb. 11, 1976

[30] Foreign Application Priority Data

Feb. 14, 1975 France .............................. 75.04698

[51] Int. Cl.² .............................................. H04N 5/38
[52] U.S. Cl. .................................... 358/186; 358/139; 332/18; 332/37 D
[58] Field of Search ......... 178/7.1, DIG. 4, DIG. 12; 358/10, 139, 186; 332/37 R, 37 D, 18

[56] References Cited

U.S. PATENT DOCUMENTS

3,730,984  5/1973  Smith ............................ 178/DIG. 4

FOREIGN PATENT DOCUMENTS

1,076,174  2/1960  Germany ............................ 358/139

OTHER PUBLICATIONS

Proceedings of Joint Conference on Television Measuring Techniques-London, England, May, 1970, pp. 199-207.

*Primary Examiner*—Robert L. Richardson
*Attorney, Agent, or Firm*—Cushman, Darby & Cushman

[57] ABSTRACT

The arrangement essentially comprises a corrector whose parameters are variable and controlled by a generator which during each one of periodic test time intervals, gives a random value to each of these parameters. For each such combination of parameters, a measurement of the distortion of the so corrected signal is effected and compared with a previously stored result, which was obtained with another, also stored, combination. The combination of parameters applied to the corrector outside the test intervals, is that which has yielded the best result.

4 Claims, 2 Drawing Figures

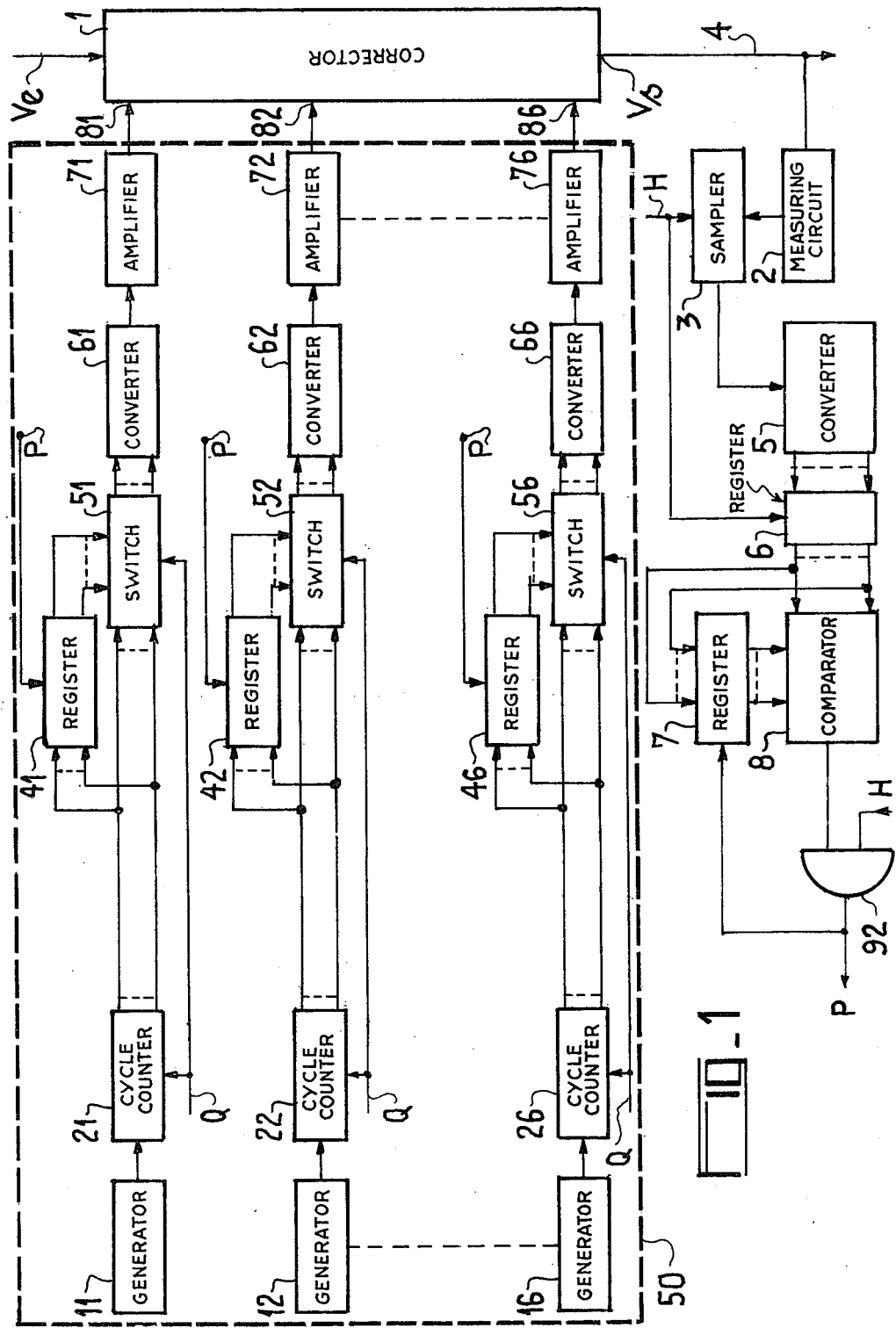

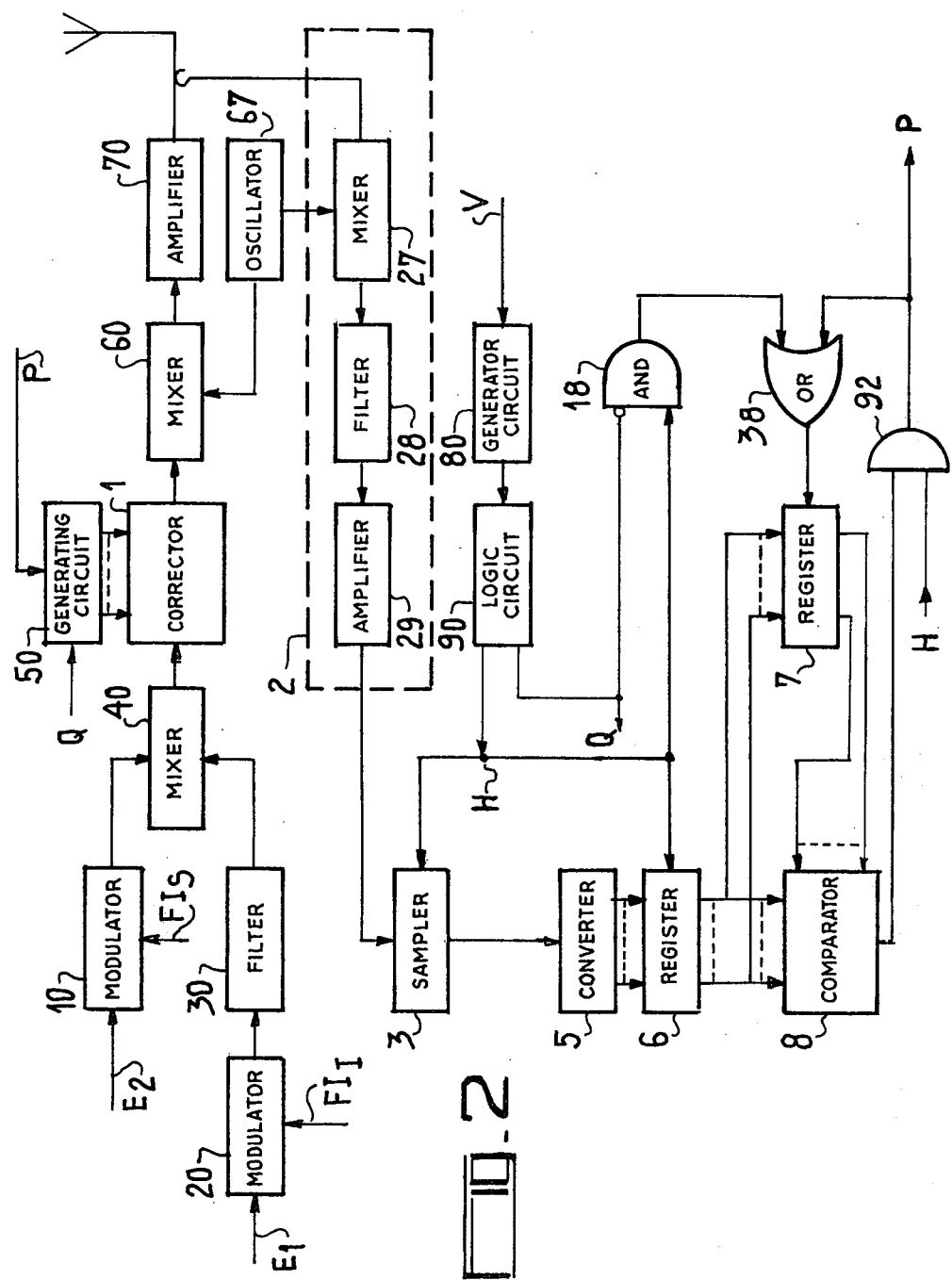

AUTOMATIC DISTORTION CORRECTION ARRANGEMENT

The present invention relates to automatic correction arrangements and applies more particularly to the correction of distortions produced in the power stages of television transmitters (and relay transmitters), by non-linearity effects.

Generally, the known automatic correction arrangements are such that their transfer function relatively to the signal which is to be corrected, follows a law which is the reverse of the law obeyed by the transfer function of the non-linear element; for example, a conventional non-linearity correcting arrangement introduces into the signal applied to it a distortion compensating for the distortion which is to be corrected, so that the resultant characteristic is linear.

To do this, it is necessary for the distortion introduced by the non-linear element to vary according to a precise law as a function of a parameter which may, for example, be the amplitude of the signal being corrected itself.

In certain cases, the distortion of the signal for correction varies as a function of one or more parameters according complex or unstable laws, and cannot be compensated in a simple manner by means of a conventional corrector.

The object of the invention is an automatic correcting arrangement which is suitable for this latter case, provided the distortion can be measured.

According to the invention, there is provided an automatic distortion correcting arrangement comprising:

a variable characteristic corrector having an input for receiving an input signal $n$ independant control inputs for controlling $n$ respective parameters of said variable characteristic, where $n$ is a positive integer, and an output;

a generating system, having a control input, for supplying said $n$ control inputs respectively with a set of $n$ random signals, during each one of recurrent test time intervals separated by longer time intervals, and with a set of $n$ signals identical with a selected set of $n$ signals previously generated by said generating system during one of said test time intervals, during each one of said longer time intervals;

a channel having an input coupled to said corrector output, and an output;

measuring means, having an input coupled to said channel output, and an output, for delivering in the course of each one of recurrent time intervals including at least all the test time intervals, an output measurement signal characteristic of the degree of distortion of the output signal from said channel;

and a control device having an input coupled to said measuring means and an output coupled to said generating system control input, for controlling the selected set of $n$ signals applied to said corrector $n$ control inputs, during each one of said longer time intervals.

The invention will be better understood and others of its features rendered apparent from a consideration of the ensuing description and related drawings in which:

FIG. 1 is a block diagram of an automatic correcting arrangement in accordance with the invention;

FIG. 2 illustrates an automatic correcting arrangement in accordance with the invention, applied to the precorrection of the intermodulation produced in the high-frequency power stages of a television transmitter.

In FIG. 1 an input supplies to a corrector 1 a signal $V_e$ which is distorted. It is assumed that the distortion thereof can be measured, the most common case, which will be assumed in this example, being that in the course of recurrent time intervals I having a duration $T_o$ and recurrence frequency $F = 1/T$, with $T_o$ smaller (generally much smaller) than T, the $V_e$ signal, disregarding any distortion thereof, is predetermined constant signal, which can precisely be inserted in a transmitted signal, for testing purposes.

The action of corrector 1 on signal $V_e$ is a function of six random voltages $U_1, U_2 \ldots U_6$ respectively applied to the control inputs 81 to 86 of the corrector. Those voltages are supplied to the corrector by a generating system 50, under the action of a test signal Q supplied within each time interval I, this test signal having a duration $\tau$ slightly smaller than $T_o$.

The time intervals coinciding with signal Q will be said test intervals, and the generally much longer time intervals separating the test intervals will be said normal intervals.

A measuring circuit 2 receives the output signal $V_s$ of the corrector 1 through the line 4 and measures this distortion. The output of the measuring circuit is connected to a sampling and holding circuit 3 (i.e. storing the last sampled value) operating at the period T during time intervals $(t_1, t_2)$ which are less than $\tau$, under the control of a clock signal H. The output of the circuit 3 supplies a voltage D which is the higher, the higher the measured distortion is, and is connected to the input of an analogue-digital converter 5. Thus, at the $p$ outputs of this converter, at the period T there appear digital values proportional to the distortions measured during each sampling time $(t_1, t_2)$ The $p$ outputs of the converter 5 are connected to the $p$ inputs of a shift-register 6 unblocked by the trailing edges of the clock pulses H. Thus, the content of the converter 5 is recorded in the register 6 at the period T. The $p$ outputs of this register are connected on the one hand to a second shift-register 7, with a write-in control input and on the other hand to the $p$ first inputs of a comparator 8 whose $p$ second inputs are connected to the $p$ outputs of the register 7 which, as will be seen, always contains a value previously stored in register 6.

Comparator 8 supplies a 1 signal if the value stored in register 6 is lower, i.e. better, than that stored in register 7, and 0 in the contrary case. Its output is connected to the first input of an AND-gate 92 whose second input receives the pulses H slightly delayed by a delay element not shown. Gate 92 thus supplies a short pulse P if the comparator supplies a 1 signal at the time of a delayed pulse H. This pulse P is applied to the control-input of register 7. Register 7 thus always contains the digitalized value of the sampled voltage D representative of the best correction obtained until then. If a pulse P has been obtained for a combination of voltages $U_1$ to $U_6$, this same combination will also be applied to the corrector during the normal interval which follows the test interval. In the contrary case, the combination of parameters applied will be that applied to the corrector during the preceding normal interval.

The generating system 50, supplying voltages $U_1$ to $U_6$, comprises six free-running generators 11 to 16 which supply signals whose frequency varies with time, these frequencies being independant, random and different from the sampling frequency F of voltage D.

The output of the generators 11 to 16 are respectively connected to the signal inputs of six cycle counters 21 to 26, each supplying in binary code the number of cycles in the signal issuing from the corresponding generator during the period T separating two measurements of the distortion. The $n$ outputs of each of these counters 21 to 26 are respectively connected with the $n$ inputs of each six respective registers 41 to 46 and with the $n$ first inputs of each of six respective switches 51 to 56. These six counters are blocked for the duration of the signal Q which is applied to a control input of each one of them. Between the Q signals, the $n$ outputs of the counters are disconnected. The registers 41 to 46 each comprise a write-in input to which the pulses P are applied for causing then to record the signals existing at its $n$ inputs. The $n$ outputs of each of these six registers 41 to 46 are respectively connected to $n$ second inputs of each of the six switches 51 to 56, which are also controlled by the test signal Q, each comprises $n$ outputs respectively connected to the $n$ inputs of each of six digital analogue converters 61 to 66. When the test signal Q controlling the switches is present, the $n$ outputs of the switches 51 to 56 are respectively connected to their $n$ first inputs; in the contrary case, their $n$ outputs are connected to their $n$ second inputs.

The outputs of the six digital-analogue converters 61 to 66 are respectively connected to the inputs of the amplifiers 71 to 76 whose outputs voltages $U_1$ to $U_6$ respectively supply the control inputs of the corrector.

Thus, the corrector 1 always receives, during normal intervals, voltages $U_1$ to $U_6$, elaborated from data stored in the respective registers 41 to 46. But, by effect of signal P, the data contained in those registers are substituted by new ones each time a better combination is recognized by comparator 8.

An embodiment of the automatic correcting arrangement according to the invention, applicable to the pre-correction of intermodulation of the kind introduced by non-linearity effects in the power stages of transmitters and relay transmitters designed for video and audio transmission through a single channel, has been shown in FIG. 2.

The transfer function of a four-terminal device in which all the power stages introducing non-linearities are assumed to be combined, takes the form:

$$W_S = k_1 W_e + W^2_e + \ldots k_p W_e^p$$

where $W_e$ is the input voltage to the four-terminal device, $W_s$ its output voltage and $k_1, k_2 \ldots k_p$ coefficients. In the case of television transmitters transmitting video and audio signals through a single channel, the frequency spectrum of the signal passing through the power stages comprises three main frequencies: $F_I$, the video carrier frequency of amplitude $E_I$, $F_S$ the audio carrier frequency of amplitude $E_S$; $F_{BL}$ the colour sub-carrier assumed hereto be the PAL subcarrier, of amplitude $E_{BL}$.

If the four-terminal device has a non linear combination of these three frequencies applied to it, its transfer function taking the form referred to earlier, then in the spectrum it produces in addition to fundamentals at the frequencies $F_I$, $F_S$ and $F_{BL}$, further components corresponding to the harmonic of these frequencies and their intermodulation products.

Experience shows and calculations confirm, that for $F_I = 0$, $F_{BL} = 4.43$ MHz and $F_S = 5.5$ MHz, two of these intermodulation components, $F_1$ and $F_2$, are located in the pass-band 0 to $F_S$, of the transmitter: (limiting the above-mentioned transfer function to $p = 3$).

1. $F_1 = F_I + F_S - F_{BL}$, for which the amplitude is $E_1 = (3/2)k_3 E_I E_S E_{BI}$
2. $F_2 = 2F_{BL} - F_S$ for which the amplitude is $E_2 = \frac{3}{4}k_3 E_S E_{BL}^2$.

It is seen that: $E_1 E_2 = 2. (E_I E_{BL})$. However, the component of frequency $F_I$ is at $-8$ dB. (0 dB corresponding to the level $E_o$ of the horizontal sync. pulse peak) and the component of frequency $F_{BL}$ is at $-16$ dB.

The amplitude of $F_2$ is therefore attenuated by 14 dB in relation to that of $F_1$. The components $F_1$ and $F_2$ have the effect of degrading the initial information and can only be tolerated within a certain relative amplitude in relation to $E_o$.

The component of frequency $F_2$ is negligible in relation to that of frequency $F_1$.

The relative amplitude of the component at $F_1$, to $E_o$, is known as the third order intermodulation ratio and in accordance with the relevant television standards must be less than a value ranging between $-52$ dB and $-60$ dB.

Measurement of the component at frequency $F_1$ is characteristic of the non-linearity and makes it possible therefore to automatically correct the intermodulation introduced by the power stages.

The corrector used in the arrangement to be described is a conventional linearity correcting device controlled by six independent parameters which are direct voltages which on the one hand define three thresholds beyond which the slope of the transfer characteristic of the corrector is modified, and on the other hand the corresponding values of these three slopes. Since, by definition, a linear system does not have any intermodulation, influencing of the linearity can have the effect of reducing the intermodulation, that is to say the level of $E_1$. But the minimal value of $E_1$ is not linked by a single simple relationship with the parameters which govern the corrector; it is therefore necessary to influence these parameters in a random way in order to exploit all the possible states of the corrector in order to find the optimal combination. An associated device is provided so that if the minimal value of $E_1$ is greater than the level which can be tolerated, in accordance with the standard envisaged, the amplifier gain is reduced.

FIG. 2 illustrates a television transmitting circuit including, for pre-correcting the distortion introduced in the power stages of the transmitter, an automatic intermodulation pre-correcting arrangement according to the invention. The input $E_1$ is designed to be supplied with a video frequency signal and the input $E_2$ with the audio signal.

Elements which are the same as those in FIG. 1 are marked by the same references in FIG. 2. Those elements are connector 1, with the abovementioned parameters, random voltage generating system 50, measuring circuit 2, given here in a detailed way, and the elements 3, 5, 6, 7, 8 and 92 all those elements operating in the same way as in the case of FIG. 1 but for the pulses applied to the write-in input control of register 7.

The inputs $E_1$ and $E_2$ are respectively connected to intermediate frequency modulators 20 and 10 supplied also with the corresponding intermediate frequency signals $IF_I$ and $IF_S$. The output of the modulator 20 is connected to the input of a bandpass filter 30. The outputs of the modulator 10 and the filter 30 are connected to the inputs of a mixer 40. The output of the mixer 40 is connected to the input of the corrector 1. The output of this last device is connected to an input of a mixer 60 supplied at a second input with the signal of a local oscillator 67 and supplying the transmission frequency. The output of the mixer 60 is connected to the input of the distortion introducing power stages 70 whose own output is connected to a broadcasting antenna.

To measure the intermodulation component of frequency $F_1$, part of the output signal from stages 70 is picked off and applied to the measuring circuit 2 (shown in broken line in the figure) which comprises a mixer 27 supplied furthermore with the output signal from the oscillator 67 which makes it possible to convert back the intermediate frequency signal. The output signal from the mixer 27 is applied to a band-pass filter 28 centered on $F_1$. The output of this filter 28 is connected to a logarithmic amplifier 29 so that the component to be measured has an easily measurable amplitude.

The output of this amplifier is connected to the input of the sampling and holding circuit 3.

In a television system and in accordance with international standards, the non-modulated components of frequencies $F_I$, $F_S$ and $F_{BL}$, having the amplitudes indicated earlier (corresponding respectively to − 8 dB, − 7 dB and − 16 dB in relation to the sync. signal peaks), are only present during an accurately defined interval I, having duration $T_o$, of a test line (test line 331). Measurement of the amplitude of the component at frequency $F_1$ which is due to intermodulation, can therefore only be properly carried out, relatively to known values, during this interval of time I.

The sampling of the measurement signal is therefore carried out within these intervals. To do this, the television signal of video frequency V is applied to the input of a conventional circuit 80 which producing a signal at the field period T and of level 1, during the intervals I, at the recurrence frequency F, in each test line 331. From this signal, a circuit 90 derives pulses H at the frequency F and pulses Q, during test time intervals at recurrence frequence F/2, each pulse Q being within an interval I. The pulses Q, determining the test intervals, are applied to the generating system 50, and the pulses H, as previously, to the elements 3, 6 and 92. For a test interval, the system 3-5-6-8-92-7 thus operates as in the case of FIG. 1. Those time intervals I, affording a distortion measurement opportunity, and within which no test time interval $\tau$ is provided, are used in order to obtain, in register 7, an up-to-date reference, i.e. to prevent corrector 1 from blocking in a condition such that the measurement carried out (which has in fact corresponded to a minimum during a first period of operation) is taken as reference for another period of operation (for example a period separated from the first by the fact that the transmitter has been stopped) although the corresponding combination of parameters no longer corresponds to the new characteristics of the transmitter.

To this end, the clock signal H appearing at the output of the circuit 90 is applied to an input of an AND-gate 18 whose other input, which is an inverted input, receives the Q pulses. The output of the gate 18, supplying those pulses H which do not occur within a test time interval, and the output of AND-gate 92, are respectively applied to the two inputs of an OR-gate 38 whose output is connected to the write-in control input of the register 7.

The content of the register 6, which (in the case of FIG. 1) was only transferred to the register 7 when the comparator supplied a pulse, is thus systematically transferred, at the recurrence frequency of F/2, into the register 7, and during the other test intervals when gate 92 supplies a P pulse.

The ratio of the recurrence frequency of pulses Q relatively to frequency F is equal to ½. It has been thus chosen to simplify the equipment, but this rythm can be much increased in order to increase the test rythm and to get thus more quickly an optimal tuning.

This arrangement is applicable in a general way to any correcting situation in which it is possible to measure the defect to be corrected and in which an automatically controllable corrector is available to act upon this defect. The arrangement may for example be used to correct differential phase or group delay.

Of course, the invention is not limited to the embodiments described and shown which were given solely by way of example.

What we claim is:

1. An automatic distortion correcting arrangement comprising:
   a variable characteristic corrector having an input for receiving an input signal, $n$ independent control inputs for respectively controlling $n$ parameters of said variable characteristic, where $n$ is a positive integer, and an output;
   a generating system, having a control input, for supplying said $n$ control inputs respectively with a set of $n$ random signals, during each one of recurrent test time intervals separated by longer time intervals, and with a set of $n$ signals identical with a selected set of $n$ signals previously generated by said generating system during one of said test time intervals, during each one of said longer time intervals;
   a channel having an input coupled to said corrector output, and an output;
   measuring means, having an input coupled to said channel output, and an output, for delivering in the course of each one of recurrent time intervals including at least all the test time intervals, an output measurement signal characteristic of the degree of distortion of the output signal from said channel;
   and a control circuit having an input coupled to said measuring means and an output coupled to said generating system control input, for controlling the selected set of $n$ signals applied to said corrector $n$ control inputs, during each one of said longer time intervals.

2. A correcting arrangement as claimed in claim 1, wherein said generating system comprises: $n$ digital means having respective outputs for supplying, during each time test interval, $n$ random digital data; $n$ storing means having respective control inputs coupled to said generating system control input for, upon a pulse being applied to said generating system control input in the course of a test time interval, respectively storing the $n$ random digital data appearing at said outputs of said $n$ digital means, and respective outputs; $n$ digital-to-analogue converting circuits having respective inputs, and respective outputs coupled to said corrector $n$ control inputs; and switching means for respectively coupling said inputs of said $n$ digital-to-analogue converting circuits to said $n$ outputs of said $n$ digital means during each one of said test time intervals, and to said outputs of said $n$ storing means during each one of said longer time intervals; and wherein said control circuit comprises: further storing means having a signal input forming said control circuit input, a control input coupled to said control circuit output, for, upon a pulse being applied to said control input, recording said output measurement signal, and an output; and comparing means, having first and second inputs respectively coupled to said output of said measuring means and to said output of said further storing means and an output forming said control circuit output, for comparing said output measurement signal with the measurement signal recorded in said further storing means, and delivering an output pulse if this output measurement signal is characteristic of a lesser degree of distortion than the recorded measurement signal.

3. A correcting arrangement as claimed in claim 2, for effecting a precorrection of said input signal, said input signal being a television signal, wherein said channel includes the power stages of a television transmitter, each one of said test time intervals is one of periodic intervals in test lines of said television signal, during which the components of the television signal spectrum have known amplitudes, and wherein said output measurement signal is characteristic of an intermodulation between said components.

4. A correcting arrangement as claimed in claim 3 wherein said recurrent time intervals comprise all of said periodic intervals, $(m-1)$ out of $m$ successive recurrent time intervals, where $m$ is an integer greater than 1, being test time intervals, and wherein said control device further comprises means for applying a pulse to said further storing means control input during each one of said recurrent time intervals which is not a test time interval.

* * * * *